United States Patent
Terrien et al.

(10) Patent No.: US 11,318,411 B2
(45) Date of Patent: May 3, 2022

(54) COLD MEMBRANE NITROGEN REJECTION PROCESS AND SYSTEM

(71) Applicant: Air Liquide Advanced Technologies US LLC, Houston, TX (US)

(72) Inventors: Paul Terrien, Syracuse, NY (US); Alex Augustine, King of Prussia, PA (US); Kevin Weatherford, Houston, TX (US); Yong Ding, Waban, MA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 176 days.

(21) Appl. No.: 16/701,924

(22) Filed: Dec. 3, 2019

(65) Prior Publication Data

US 2021/0162336 A1 Jun. 3, 2021

(51) Int. Cl.
  *B01D 53/22* (2006.01)
(52) U.S. Cl.
  CPC ...... *B01D 53/226* (2013.01); *B01D 2256/245* (2013.01); *B01D 2257/102* (2013.01); *B01D 2257/80* (2013.01); *B01D 2259/65* (2013.01); *B01D 2313/38* (2013.01); *B01D 2317/04* (2013.01); *B01D 2317/06* (2013.01)
(58) Field of Classification Search
  None
  See application file for complete search history.

(56) References Cited

U.S. PATENT DOCUMENTS

| | | | |
|---|---|---|---|
| 4,556,180 A * | 12/1985 | Manatt | B64D 37/32 244/135 R |
| 5,378,263 A * | 1/1995 | Prasad | B01D 53/226 95/45 |
| 5,647,227 A | 7/1997 | Lokhandwala | |
| 5,669,958 A | 9/1997 | Baker et al. | |
| 5,964,923 A | 10/1999 | Lokhandwala | |
| 6,035,641 A * | 3/2000 | Lokhandwala | B01D 53/226 60/649 |
| 6,425,267 B1 * | 7/2002 | Baker | B01D 53/228 62/624 |
| 6,630,011 B1 * | 10/2003 | Baker | B01D 53/225 95/47 |
| 2007/0125537 A1 * | 6/2007 | Lokhandwala | B01D 53/22 166/291 |

(Continued)

FOREIGN PATENT DOCUMENTS

| EP | 0 778 068 | 6/1997 |
|---|---|---|
| EP | 0 862 937 | 9/1998 |

OTHER PUBLICATIONS

Lokhandwala, et al., "Membrane separation of nitrogen from natural gas: A case study from membrane synthesis to commercial deployment," Journal of Membrane Science, 346, (2010), pp. 270-279.

(Continued)

*Primary Examiner* — Jason M Greene

(74) *Attorney, Agent, or Firm* — Christopher J. Cronin

(57) ABSTRACT

An approach for separating a gaseous mixture includes a multi-stage membrane system in which a rubbery membrane is operated at a low temperature. Various streams are cooled and heated in a multi-fluid heat exchanger. In specific configurations, the multi-fluid heat exchanger is cooled by using no fluids other than fluids derived from the permeate and/or residue generated in the first membrane stage.

16 Claims, 2 Drawing Sheets

(56) References Cited

U.S. PATENT DOCUMENTS

| | | |
|---|---|---|
| 2010/0077796 A1 | 4/2010 | Gadre et al. |
| 2012/0000359 A1* | 1/2012 | Bresler .................. C10L 3/104 95/51 |
| 2017/0304769 A1 | 10/2017 | Bigeard et al. |
| 2019/0105603 A1* | 4/2019 | Bhuwania ............ B01D 53/229 |
| 2019/0201838 A1 | 7/2019 | Bikson |
| 2019/0321780 A1 | 10/2019 | Bikson et al. |

OTHER PUBLICATIONS

Pathare, et al., "Design of membrane cascades for gas separation," Journal of Membrane Science, 364, (2010), pp. 263-277.
International Search Report and Written Opinion for PCT/US2020/062667, dated Feb. 2, 2021.
International Search Report and Written Opinion for PCT/US2020/062669, dated Feb. 2, 2021.

* cited by examiner

COLD MEMBRANE NITROGEN REJECTION PROCESS AND SYSTEM

BACKGROUND OF THE INVENTION

A component that can often be found in biogas or in natural gas is nitrogen ($N_2$). While not presenting a major problem for some applications, nitrogen generally reduces the heating value of natural gas. Although small amounts of this inert gas can often be tolerated, natural gas containing levels higher than 4-5% vol of $N_2$ is typically unacceptable.

Various approaches can be employed to reduce nitrogen levels. The most common rejection technology relies on cryogenic separation. While relatively efficient, the cryogenic removal of $N_2$ can requires large equipment and balance of plant, rendering this approach uneconomical in some situations, particularly for small flow rates.

Membrane separation is a very cost effective and simple way to separate gases. Separating $CH_4$ and $N_2$, however, proves to be difficult. Some rubbery membranes such as poly(dimethylsiloxane) and derivatives, polymethyloctylsiloxane, and polyamide-polyether copolymer can achieve a $CH_4$-to-$N_2$ selectivity of 2 to 4. Generally, this is not found satisfactory for generating a high product purity and good product recovery.

It is known that the $CH_4/N_2$ selectivity can be increased at low temperatures (below 0° centigrade (C)). U.S. Pat. No. 5,669,958 to Baker et al., for example, describes operating poly-siloxane membranes at temperatures as low as −50° C., for a $CH_4/N_2$ selectivity of up to 6, to remove $N_2$ and generate pipeline quality gas with high methane recovery. The method described in this patent utilizes a turbo-expander to supply the cooling required by the process.

In U.S. Pat. No. 6,425,267 to Baker et al., a two- or three-stage membrane process for $CH_4/N_2$ separation is conducted at an intermediate low temperature such that high $CH_4$ recovery is achieved without the use of external refrigeration or turbo-expansion. The incoming feed gas is cooled to a sub-ambient temperature by a combination of residue and permeate streams; the cooling is generated by the Joule-Thomson effect of the membranes.

U.S. Pat. No. 6,630,011 B1 to Baker et al. describes a separation of $CH_4$ and $N_2$ that uses a multi-stage membrane process to achieve high methane recovery. The process is optionally operated fully or partially at low temperature for enhanced performance.

One problem associated with many existing approaches relates to the cost effectiveness of reaching the lowest membrane operating temperatures possible. Other difficulties are raised by the numerous heat exchangers and temperature limitations that interfere or prevent the operation and control at an optimal temperature. In addition, many of the existing two- or three-stage membrane processes fail to address optimization of not just one but of each membrane operating temperature. For example, if the first membrane stage is operated at a temperature optimally low, no solution is provided for also operating a second membrane stage at an optimal temperature.

In more detail, a main limitation of the process described in U.S. Pat. No. 6,630,011 B1 relates to the numerous heat exchangers employed and the temperature limitation which may not allow operation and control at optimal temperature. Even if the patent contemplates the possible use of a multi-sided heat exchanger, it does not provide any guidance regarding an appropriate process design for its implementation.

Neither U.S. Pat. No. 5,669,958 nor U.S. Pat. No. 6,425,267 explicitly identify multi-sided heat exchangers as the preferred method of heat integration.

Additionally, U.S. Pat. Nos. 5,669,958, 6,425,267, and 6,630,011 fail to provide any details on how to operate such a low temperature membrane system while operating each membrane stage at an optimal temperature. In particular, if a first membrane stage is operated at a temperature optimally low, no solution is provided to also operate a second membrane stage at an optimal temperature.

Furthermore, U.S. Pat. Nos. 5,669,958, 6,425,267 and 6,630,011 fail to teach the integration of the membrane process and the upstream dehydration process via use of the $N_2$-rich residue stream for adsorbent bed regeneration.

While a multi-sided heat exchanger in a three-stage membrane process, at cold temperatures, is disclosed by Bigeard et al., in U.S. Patent Application Publication No. 2017/0304769 A1, the separation of interest in this publication is $CO_2/CH_4$. Furthermore, U.S. 2017/0304769 fails to recognize or appreciate that the low temperatures can be used to minimize the compression energy requirements.

Therefore, a need continues to exist for $N_2$ rejection technologies that can reach sufficiently low $N_2$ levels in natural gas or some types of biogas. A need also exists for approaches that address at least some of the problems discussed above.

SUMMARY OF THE INVENTION

Generally, the process and system described herein relate to multi-stage membrane separation techniques that can be applied to reducing $N_2$ levels in a fluid stream comprising, consisting essentially of or consisting of methane and nitrogen.

To take advantage of temperature effects on the separation, for example, a mixture containing at least methane and nitrogen is cooled to a temperature below 0° C. in a main heat exchanger, typically a multi-fluid (also referred to herein as a "multi-sided") heat exchanger. The cooled feed is introduced to a first membrane stage, where it is processed to generate a first permeate and a first residue, also referred to herein as a first "retentate". The first retentate is heated, then introduced to a second membrane stage. Fluids derived from the first permeate, such as, for example, the first permeate itself or the first permeate purified in a subsequent membrane separation stage, are methane-rich and typically represent the product stream. Fluids derived from the permeate from the second stage can be recycled, e.g., across the main heat exchanger, to the first membrane stage so that the first membrane stage can receive the cooled gas mixture and also the fluids derived from the permeate from the second stage.

Various streams directed to or from the membrane separation stages employed can be heated or cooled in the main heat exchanger. For many aspects of the invention, no fluid or fluids other than fluids derived from the first permeate and/or the first residue is/are used to cool the main heat exchanger.

One specific embodiment features a two-stage membrane separation process in which a feed containing methane and nitrogen is cooled and the cooled feed is processed in a first membrane stage to generate a first permeate, which can be collected as a methane-rich product, and a first residue. The first residue is heated and then processed in the second membrane stage to produce a second permeate, which can be recycled to the feed or the cooled feed, and a second residue, which is nitrogen enriched and can be discarded or reused.

Other embodiments involve at least one additional membrane separation stage. A three-stage arrangement, for example, involves a first, second and third membrane separation stages generating, respectively, a first, second and third permeate fractions and a first, second and third residue fractions.

In one specific example, the first permeate stream (obtained from the first stage) is passed to a third membrane to further enrich the methane-rich product, obtained, in this arrangement, as the third permeate. The first residue stream (obtained from the first stage) is directed to a second stage configured to recover additional methane. The second permeate (obtained from the second stage) and/or the third retentate (obtained from the third stage) can be recycled back to the first stage. The second residue represents the nitrogen-rich fraction, which can be discarded as waste or reused.

In another specific example, the first permeate (obtained from the first stage) constitutes a methane-rich product stream. The second permeate (obtained from the second stage) is processed in a third stage to obtain a third permeate. Enriched in methane, this third permeate can be recycled to the first stage. Nitrogen-rich fractions obtained as retentates from the second and/or third stage can be handled as a waste product or reused.

A bypass valve from the initial feed (at a temperature typically above room temperature) to the cooled feed stream (at a temperature below 0° C., for instance) can be used to control the temperature of the cooled feed stream entering the first membrane.

Many embodiments involve raising the pressure of a stream such as a product or a recyclable stream. In some cases, the stream to be compressed is provided at a sub-ambient temperature.

While in a typical $N_2$—$CH_4$ separation, the $N_2$ residue is considered disposable and handled as a waste product, some implementations of the invention do not discard this stream but rather use in another operation. In one example, the $N_2$-rich fraction is utilized to regenerate an adsorbent bed used to remove moisture from a mixture containing, methane, nitrogen and water to produce the feed that is cooled and then directed to the first membrane stage in a multi-stage membrane separation process described herein.

Further aspects of the invention relate to a membrane separation system including a multi-stage membrane separation arrangement and a main heat exchanger, typically a multi-fluid heat exchanger. The main heat exchanger is configured to heat a first residue obtained from a first membrane stage. Cooling in the main heat exchanger is provided only by fluids derived from a permeate and/or a residue generated in a first membrane stage.

Generally, the multi-stage arrangements described herein include at least one second stage that treats the residue gas from the first stage. The temperature of the feed to the first stage is optimized to be as low as possible considering the need to increase selectivity of the membrane while staying far enough from temperatures that are too low in the whole membrane stage, including on the residue side, which ends up significantly colder than the feed. While doing so, one might find it difficult to operate the second stage at a high enough temperature short of using a heater upstream of that stage or settling for operating at sub-optimal conditions in the first stage. For example, if the residue from the first membrane stage fed to the second membrane stage is too cold, condensable fluids in that residue may condense on the surface of the membranes of the second membrane stage and thereby contaminate and deteriorate them. Also, condensable fluids in that residue may freeze in conduits feeding the residue from the first membrane stage to the second membrane stage or freeze on the surface of the membranes of the second membrane stage, thereby causing catastrophic plugging and/or too high of a pressure drop for the system to work properly. Additionally, rubbery membrane should be operated at a temperature representing a safe margin away from their glass transition temperature. Otherwise, very poor performance by such rubbery membranes will be observed. For instance some polymers for use in the membranes has a glass transition temperature of −125° C. and if the gas were to be cooled down much lower than −50° C., the separation may not work properly anymore.

Practicing aspects of the invention can present additional benefits. For example, operating at the low temperatures described herein can lower compression energy requirements. Using a central (main) heat exchanger can simplify the process, reduce the overall equipment footprint and streamline its installation, operation and maintenance. With a multi-fluid heat exchanger, for example, several streams can be heated or cooled in a single device, often simultaneously. In specific implementations the main heat exchanger is cooled only by fluids derived from permeate and/or residue obtained from a first membrane stage, thus reducing, minimizing or eliminating the need for external heat transfer fluids.

Some of the multi-stage separation arrangements include a bypass valve that provides temperature control of the cooled feed entering the first membrane stage. In turn, the first membrane controls the performance of the other membranes employed. Further efficiencies can be realized by supplying streams to be compressed at a sub-ambient temperature.

The multi-stage membrane separation described herein can be integrated in an arrangement that also incorporates adsorption technology, for the removal of moisture, for example. Such an arrangement can utilize a nitrogen-rich fraction generated in the multi-stage membrane separation system to regenerate an adsorbent material used in the water removal process.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
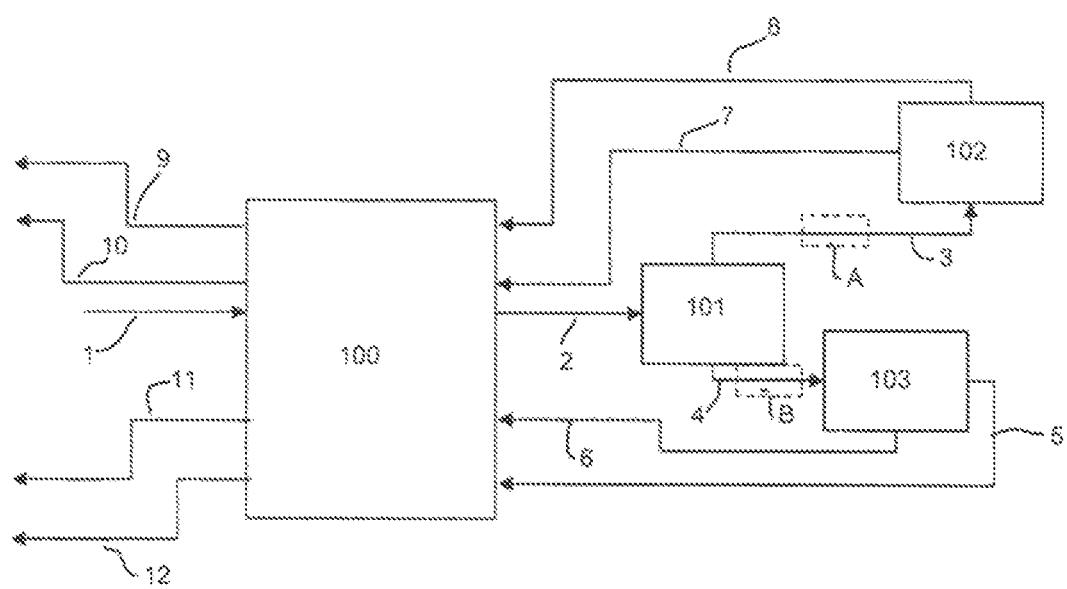
FIG. 1 is a process diagram of one embodiment of the invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention generally relates to a membrane-based separation process and system. In specific implementations, the separation removes $N_2$ from a gas mixture. The mixture can consist of, consist essentially of or comprise $CH_4$ and $N_2$. Other components that can be present, in addition to $CH_4$ and $N_2$, include water vapors, other hydrocarbons (e.g., ethane, propane, butane, pentane, hexane, etc.), carbon dioxide ($CO_2$), carbon monoxide (CO), hydrogen gas ($H_2$), helium (He), hydrogen sulfide ($H_2S$), ammonia ($NH_3$), etc. Water can be present in any amounts. If liquid water is present it will typically be removed using a gas/liquid separator as a very first step. In cases in which the water content is too high for the process described here, a dehydration system will be included in order to reach a water dew point temperature lower than the lowest temperature encountered in this process (typically a dew point of −20° C. or below).

Examples of mixtures that comprise $CH_4$ and $N_2$ include natural gas (such as but not limited to traditional natural gas, shale gas, associated gas) and biogas (such as but not limited to gas from digesters, landfills, etc.). In biogas, $N_2/CH_4$ ratio can range typically from 0-1% mol (in which case no particular nitrogen removal treatment is required) to 10% mol or more. Natural gas usually contains very small amounts of nitrogen compatible with pipeline specifications but some natural gas fields contain higher amount of nitrogen ranging from a few percent up to close to 100% in some extreme cases. The invention is particularly well suited for biogas and natural gas field with limited amount of nitrogen (typically from 3-4% mol up to 10-15% mol).

Many of the embodiments described herein involve a multi-stage membrane separation process, employing two or more (e.g., three) membranes, also referred to as membrane "stages". The membranes are selected based on their performance for the desired separation, that of $CH_4$ and $N_2$, for instance. Possible membranes that can be employed are provided in U.S. Pat. Nos. 5,669,958 and 6,630,011B1. Membranes having the potential to effect the $CH_4$—$N_2$ separation often include rubbery membranes such as those having a rubbery separation layer. Some potential examples of materials that can be employed for the separation layer include poly(dimethyl siloxane) (PDMS), e.g., homopolymers of dimethylsiloxane, and copolymers of dimethyl siloxane with methylethyl siloxane, methyl propyl siloxane, methyl butyl siloxane, methyl pentylsiloxane, methyl hexyl siloane, methyloxtyl siloane, methyl phenyl siloxane. The rubbery material can include block copolymers of dimethylsiloxane or methyloctylsiloxane with polyarylethers, polyamides, polyesters, polyketones, polyimides or block copolymers of dimethyl siloxanes or methyl octyl siloxane with silicates. Another possible material is a ladder-type silicone block copolymer with a general formula of:

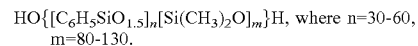

Many implementations described herein utilize a rubbery type membrane that preferentially permeates $CH_4$, with the retentate representing the $N_2$-rich fraction. Factors such as the specific membrane material, flat sheet, hollow fiber, etc. configuration, performance characteristics, and so forth, can be selected according to the process to be conducted, size of the operation, feed composition, feed properties, and so forth.

The membrane material and/or membrane attributes in the membrane stages employed can be the same or different.

The separation process and system described herein involves heating and cooling various streams. In specific aspects, the heat exchange between multiple (two or more) streams is conducted in a main heat exchanger, many implementations utilizing a multi-fluid, also referred to herein as a "multi-sided", heat exchanger, a plate-fin exchanger, e.g., a brazed aluminum heat exchanger (BAHX), for instance.

The main heat exchanger can include various commercially available types, usually custom-designed. It can be configured for counter-flow, cross-flow or various flow combinations and can be optimized with respect to various fin types, surface areas, pressure drops, etc. In many implementations, the heat exchanger is will be preferentially counter-current/counter-flow, as cross-flow or other flow combination may limit the heat recovery possible. For a continuous multi-stage separation process, multiple streams can be heated or cooled simultaneously. The heat exchanger is generally designed for the most challenging case (maximum flow, minimum cold temperature, most challenging composition) and if no particular control is put in place, temperatures will change according to operating cases. A temperature control arrangement can be employed to control the temperatures, using, for example, control valves to bypass some passes in the heat exchanger.

In many embodiments, the heat exchanger is designed to provide more cooling than necessary, while valves bypassing from warm to cold or cold to warm control each temperature accurately. Many implementations of the process, especially with respect to the first membrane, will involve running the heat exchanger as warm as possible while obtaining exactly the level of enrichment targeted (the lower the temperature, the better purity of product). In turn this would allow maintaining a constant composition of the product even if, for instance, the composition of the feed is changing.

The mixture containing, for example, at least methane and nitrogen, is often supplied to the system at a temperature above 0° C. In many cases, the temperature of the feed stream is initially at or above room temperature. To enhance a separation such as that between $N_2$ and $CH_4$, the stream directed to the first stage is cooled in the main heat exchanger to a temperature below 0° C.

A first membrane stage is used to obtain a first permeate, also referred to as a "first permeate stream" (enriched in methane) and a first residue, also referred to as a "first residue stream" (enriched in nitrogen). At least a portion of fluids derived from the first permeate and/or at least a portion of fluids derived from the first residue are heated in the main heat exchanger. As used herein, the terms "fluids derived from the first permeate" and "fluids derived from the first residue" refer to or include any fluid that is obtained, directly or indirectly, after splitting or after treatment steps, from the permeate/residue, such as, for example:

1) a fraction of the initial fluid;
2) the initial fluid or a fraction thereof after a change in conditions (pressure, temperature, vapor fraction);
3) the result of a phase separation after a phase change (for instance if the stream is partially condensed and only the gas or a part of the gas is used);
4) the result of a membrane separation (for instance only the residue or a part of the residue of a membrane treated the initial fluid).

In many cases, the fluids derived from the first permeate that are heated in the main heat exchanger represent a major portion (i.e., more than 50% by mass, such as, for example, at least 80%, at least 85%, at least 90%, at least 95%, at least 98% or even 100% by mass) of the fluids derived from the first permeate. Similarly, the portion of fluids derived from the first residue that are heated in the main heat exchanger represent a major portion (i.e., more than 50% by mass, such as, for example, at least 80%, at least 85%, at least 90%, at least 95%, at least 98% or even 100% by mass) of the fluids derived from the first residue.

According to many aspects of the invention, cooling in the main heat exchanger is provided only by fluids derived from the permeate and/or residue (stream(s)) obtained from the first membrane. In other words, the cooling in the main heat exchanger uses no external fluids, i.e., no fluids other than those derived from the permeate and/or residue generated in the first membrane.

For many embodiments, the main heat exchanger is used to perform all the heating and cooling operations associated with the multi-stage membrane separations conducted in the process and/or system described herein.

In a typical multi-stage separation, the gas mixture containing, for example, at least methane and nitrogen, enters the system in a compressed state (e.g., 50 to 2000 pounds per square inch gauge (psig)). Streams that emerge from a membrane stage can have a reduced pressure and can be compressed using a compressor or another suitable device. In some embodiments, streams such as recyclable and/or product streams are introduced to the compressor at a sub-ambient temperature, to enhance the efficiency of the compression, for example.

Various approaches can be employed to remove nitrogen from a mixture containing at least methane and nitrogen.

Shown in FIG. 1, for example, is a diagram of a three-stage membrane separation process. As seen in this diagram, feed 1, a mixture comprising, consisting essentially of or consisting of $CH_4$ and $N_2$ is directed to a main heat exchanger, e.g., multi-fluid heat exchanger 100, where it is cooled to a temperature below 0° C., within the range of from about −100° C. to about 0° C., for example. From the multi-fluid heat exchanger 100, the cooled feed stream 2 flows to the first membrane stage, 101 where it is separated into a residue (retentate) stream 3, enriched in $N_2$, and a permeate stream 4, enriched in methane. The membranes used in each of the different stages may be the same or different. However, they are all selective for methane over nitrogen. In one specific illustrative example, membrane 101 is typically a silicone based rubbery membrane.

The two streams obtained from membrane stage 101, i.e., residue stream 3 and permeate stream 4, are directed, respectively, to a second membrane stage 102 (e.g., typically a silicone based rubbery membrane) and a third membrane stage 103 (typically a silicone based rubbery membrane, for example). In many instances, permeate stream 4 is compressed prior to its delivery to third membrane stage 103.

In the process diagram of FIG. 1, the four streams obtained from membrane stages 102 and 103, namely streams 5, 6, 7 and 8 are heated to a desired temperature in the multi-fluid heat exchanger, generating, respectively, streams 12, 11, 10 and 9.

In more detail, the product (sales gas) is the methane-rich permeate stream. It exits membrane 103 as stream 6 (at a temperature within the range of from about −5° C. to about −105° C., for example), and is further heated in heat exchanger 100 (e.g., to a temperature within the range of from about 30° C. to about −70° C.), to yield stream 11.

Residue (or retentate) stream 5 from third membrane 103, (having, for instance, a temperature within the range of from about 25° C. to about −75° C.) can be heated in multi-fluid heat exchanger 100 to a temperature within the range of from about 60° C. to about −70° C. The resulting heated fluid stream 12 can be recompressed and recycled back to the first membrane 101. A similar arrangement for recycling back to the first membrane stage 101 can be implemented with respect to the permeate stream 7, exiting second membrane stage 102 (e.g., at a temperature within the range of from about 25° C. to about −75° C.) and heated in the main heat exchanger 100 to form heated stream 10 (characterized, for example, by a temperature within the range of from about 60° C. to about −70° C.).

Stream 8, the residue stream from second membrane stage 102, exits the membrane at a temperature within the range of from about 25° C. to about −75° C.) and is heated in heat exchanger 100 to a temperature within the range of from about 60° C. to about −70° C. to obtain residue stream 9. This stream is the nitrogen-rich, methane-lean component. Although in many cases, this stream is handled as a waste stream, specific embodiments of the invention use the nitrogen-rich component in other application, as further discussed below.

A bypass valve (not shown in FIG. 1) from feed stream 1 to cooled feed 2 can be installed to control the temperature of cooled feed 2. Typically, the temperature of cooled feed 2 will control the performance of all three membrane stages.

Since the process in membrane 101 can be associated with a large or very large Joule-Thomson effect, residue and permeate can exit this membrane at a very low temperature. In some embodiments, streams 3 and/or 4 are heated to a desired temperature. On the process diagram of FIG. 1, the heating steps of the residue and permeate streams are indicated, respectively, as heating steps A and B. Either or both heating steps can be conducted in the multi-fluid heat exchanger 100, valorizing fully the refrigeration available. Other approaches can utilize additional heat exchangers. In illustrative examples, the temperature of streams 3 and/or 4 can be raised from a low temperature in the range of from about −5° C. to about −105° C. to a higher temperature in the range of from about 25° C. to about −75° C.

Controls that can be incorporated in the process and/or system of FIG. 1 include the partial heating or cooling of stream 4, preferably in multi-fluid heat exchanger 100; the partial heating or cooling of stream 3, preferably in the multi-fluid heat exchanger 100; and/or the Joule-Thomson expansion of the membrane 102 residue 8 across a valve.

The efficient operation of the process illustrated in FIG. 1 allows for excess cooling which can be exploited in heat exchanger 100. For example, the excessive cold temperatures generated in the system can be exploited in the heat exchanger to cool another stream. In one implementation, the stream being cooled, to a temperature as low as 0° C., for instance, is a recycle stream. Since recycle streams may need to be compressed before being added to a feed stream, for example, applying the excessive cold to a recycle stream reduces or minimizes the required compression energy. In another implementation, the excess cooling is applied to the product methane stream. This stream must also be compressed and is associated with the lowest compression energy cost when cold.

Another approach applicable in some situations involves a simplified two-stage membrane separation process and/or system. As with other arrangements described herein, this simplified approach can provide a pipeline quality gas stream with an $N_2$ content of less than 3-5% (by volume) from feed compositions that have a $N_2$ content of less than 10-15%.

Figure 2:
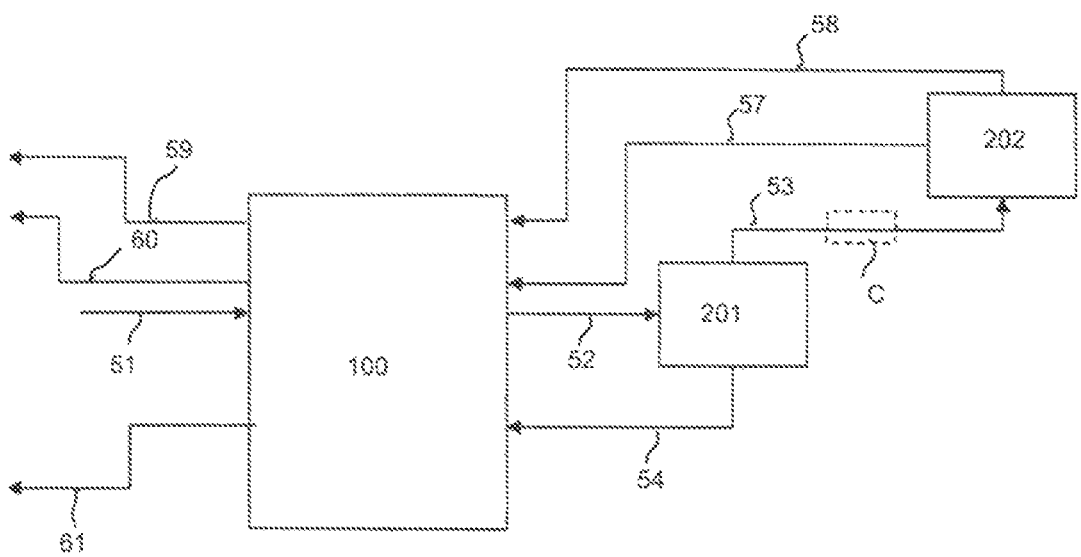
FIG. 2 is a process diagram of another embodiment of the invention.

An illustration of a two-stage separation is provided in FIG. 2. Specifically, a feed stream 51 is directed to a main heat exchanger, e.g., multi-fluid heat exchanger 100, where it is cooled to a temperature below 0° C. (within the range of from about 0° C. to about −100° C., for example). The resulting cooled feed exits the multi-fluid heat exchanger 100 as stream 52 and is passed to a first membrane stage 201. First membrane 201 can be a rubbery membrane, e.g., silicone membrane.

Residue stream 53, generated in first membrane stage 201, is directed to second membrane 202 (e.g., a silicone membrane or another suitable rubbery membrane, for example) to produce permeate stream 57 and residue stream 58. These streams can be passed through multi-fluid heat exchanger 100 to produce permeate stream 60, which can be recycled back to the feed, typically after recompression, and the $N_2$-rich, methane-lean residue stream 59 (a stream that can be handled as a waste product, or used as further described below).

In one illustration, stream 57 has a temperature within the range of from about −5° C. to about −105° C., while stream 60 has a temperature within the range of from about 60° C. to about −75° C. In another illustration, stream 58 has a temperature within the range of from about −5° C. to about −105° C., while stream 59 has a temperature within the range of from about 60° C. to about −75° C. In one implementation an additional control is added for the Joule-Thomson expansion of the second membrane 202 residue stream 58 across a valve.

Residue stream 53 exiting first membrane stage 201 can have a very low temperature (within the range of from about −5° C. to about −105° C., for instance) due to a large or very large Joule-Thomson effect in the first membrane. Many implementations provide for an additional control in which this stream is heated to an appropriate temperature (e.g., from about 25° C. to about −75° C.). In FIG. 2, this step is labeled C. The heating step can be conducted while valorizing fully the refrigeration available, typically by introducing this stream in the same multi-fluid heat exchanger, or with additional economizer/heat exchangers.

Permeate stream 54 exits membrane stage 201 at a temperature within the range of from about −5° C. and about −105° C. and is heated in multi-fluid heat exchanger 100 to produce product (sales gas) stream 61, which can have a temperature within the range of from about 60° C. to about −75° C.

As in the approach of FIG. 1, a bypass valve from feed stream 51 to cooled feed stream 52 can be installed to control the temperature of cooled feed 52. This temperature will control the performance of both membrane stages.

Another multi-stage membrane separation approach uses three-stages and is described with reference to FIG. 3. In some cases, the process or system shown in FIG. 3 can be thought of as an alternative to the approach described with reference to FIG. 1.

In many implementations, the initial feed can have a temperature within the range of from about 0° C. to about 80° C. and a pressure within the range of from about 50 psig to about 2000 psig. As shown in FIG. 3, feed portion 404 is cooled in multi-fluid heat exchanger 100, then combined with one or more recycle streams (further described below) to produce stream 406, which is directed to a first membrane stage 301A, a rubbery membrane such as, for instance, silicone membrane. A bypass valve F1 from the feed stream to the cooled stream can be installed (see stream 403) in order to control the temperature of cooled feed 406. This temperature can control the performance of all three membrane stages. Typically, stream 406 is introduced to the first membrane stage 301A at a temperature below 0° C., such as, for example, within the range of from about 0° C. to about −100° C. In one example, the temperature of this stream is about −13° C.

Due to the large and often very large Joule-Thomson effect in membrane 301A, residue and permeate exit this membrane at a low or very low temperature, generally a temperature well below that of fluid stream 406.

In many implementations, residue stream 408 can be reheated before flowing to membrane stage 301B. Raising the temperature of this fluid stream can be performed while valorizing fully the refrigeration available, typically by introducing streams in the same multi-fluid heat exchanger 100, or with additional economizer/heat exchangers. In one example, residue fluid stream 408 exits membrane stage 301A at a temperature within the range of from about −5° C. to about −105° C., e.g., −43° C. This stream is heated in the multi-fluid exchanger 100, to produce stream 417, at a temperature typically above 0° C., for example, (typically within a range of from about −75° C. to about 25° C. Stream 417 is then directed to membrane 301B.

Permeate 418, generated in membrane stage 301B, is heated in multi-fluid heat exchanger 100 from which it exits as fluid stream 409. This fluid is compressed in compressor C1. Providing stream 409 at a sub-ambient temperature (e.g., below 15° C., within the range of from about −80° C. to about 10° C., for example) can improve the efficiency of the compression operation. The compressed stream 435 (characterized by an illustrative temperature within a range of from about −20° C. to about 150° C.), is directed from compressor C1 to multi-fluid heat exchanger 100, before being introduced as stream 411 (having, for instance, a temperature within a range of from about −75° C. to about 25° C., e.g., about 10° C.) to membrane stage 302.

Some of the streams (e.g., permeate 414, from membrane stage 302 and permeate 407, from membrane stage 301A) are heated back up in the multi-fluid heat exchanger 100.

Specifically, permeate stream obtained from membrane stage 301A, namely stream 407, is heated to generate stream 421 which is compressed in compressor C3. Stream 421 can have a temperature within the range of from about −75° C. to about 60 C. Providing stream 421 at a sub-ambient temperature (below 15° C., for instance) can improve the efficiency of the compression. Compressed stream 422, exiting compressor C3 at a temperature (downstream of compressor after-cooler as represented in the figure) within the range of from about 10° C. to about 100° C., is the methane-rich, product (sales gas).

Permeate stream 414, from membrane stage 302, is heated in multi-fluid heat exchanger 100 to form stream 415 which is compressed in compressor C2. The resulting stream 416 is recycled back to the feed. In one example, fluid stream 415 has a sub-ambient temperature, e.g., within the range of from about −75° C. to about 15° C. Compressed fluid stream 416, having, for instance, downstream of after-cooler, a temperature within the range of from about 10° C. to about 100° C., e.g., 49° C., is recycled to the feed mixture to form stream 402.

Residue stream 412 from membrane stage 302 is a nitrogen-rich, methane-lean stream. In some embodiments this residue fraction from membrane 302, namely stream 412, is combined with residue fraction 419, from membrane 301B, to form the nitrogen-rich stream 420. Nitrogen-rich components can be disposed of as waste or can find applications in another operation or elsewhere in the facility. In many embodiments, fluid streams 412 and 419 have temperatures well below 0° C. (e.g., within the range of from about −105° C. to about −5° C.). Either or both streams can be heated (for instance in the main heat exchanger in order to recover additional refrigeration). In the alternative or in addition, it is possible to first combine these streams and then raise the temperature of stream 420 (for instance in the main heat exchanger in order to recover additional refrigeration).

Further operations or controls can be included. For example, stream 403 can be partially heated in multi-fluid heat exchanger 100.

Figure 3:
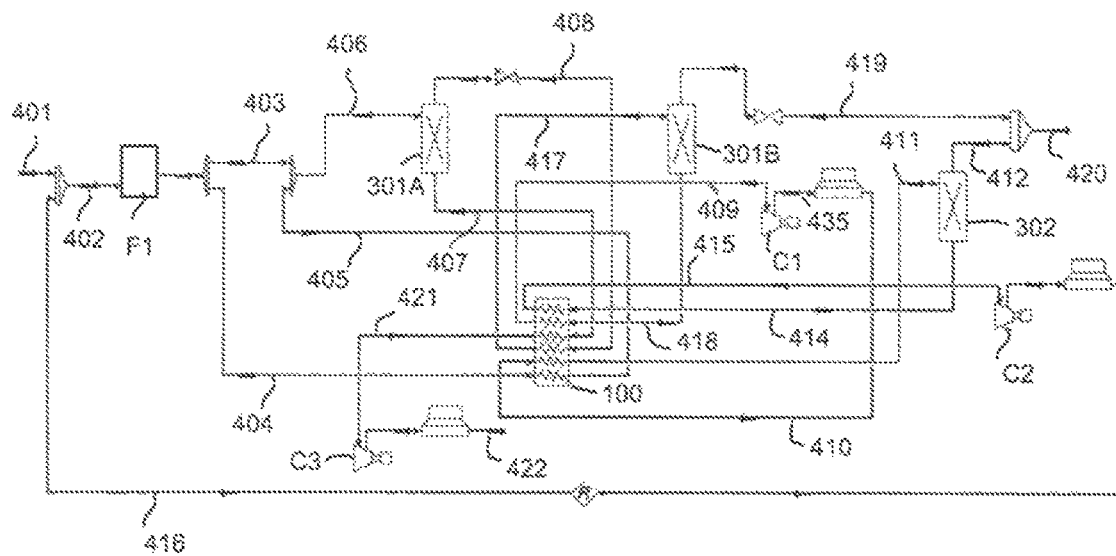
FIG. 3 is a process diagram of yet another embodiment of the invention.
Figure 4:
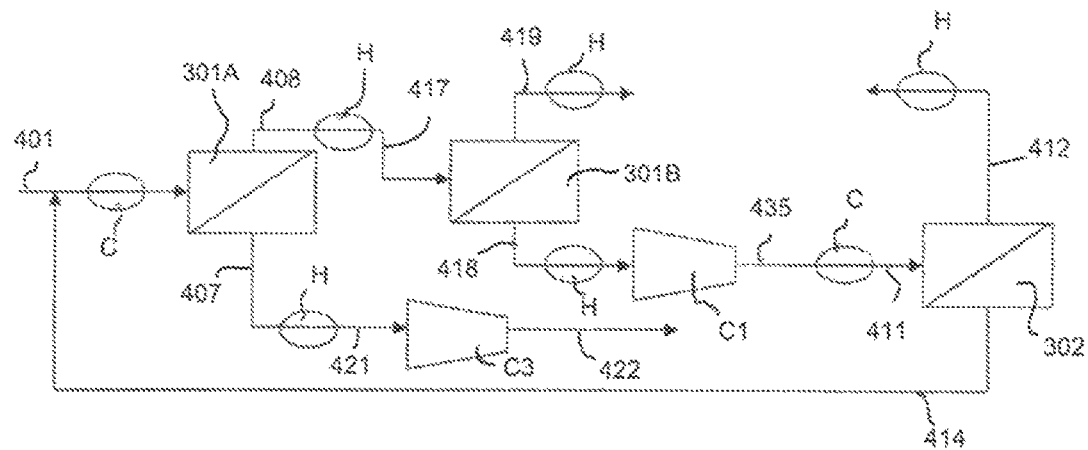
FIG. 4 is a process diagram showing heating and cooling operations conducted in a three-stage membrane separation process.

FIG. 4 is a diagram showing heating and cooling of various feeds in a three-stage membrane stage separation process similar to the process illustrated in FIG. 3. The labels H and C reference, respectively, heating and cooling operations.

Stream 422 is the methane-rich product fraction. Residue streams 412 and 419, from membranes 302 and 301B, respectively, are nitrogen-rich fractions. As discussed with reference to FIG. 3, these can be combined to form stream 420.

Typically, the nitrogen-rich fraction (e.g., stream 420 in FIGS. 3 and 4) generated in the multi-stage membrane process represents the disposable (waste) component. In some implementations this component finds a further use in another operation or elsewhere in the facility. One illustrative application is described below.

Operations at low temperature can require a deep removal of moisture, e.g., down to less than 10 ppm, or a dew point of at least 10° C. colder than the membrane operating temperature. Thus, specific embodiments described herein include a drying step that is complementary to the membrane process. In many cases, moisture is removed using adsorption-type dryers, and, in particular, adsorption-type dryers capable of removing moisture to the low levels noted above.

Some embodiments of the invention utilize a multi-bed arrangement (i.e., an arrangement including at least two beds) that can be operated in a continuous fashion, with one adsorption bed in production mode and another in regeneration mode. Adsorption technology based on multi-bed arrangements (pressure swing adsorption or temperature swing adsorption, for instance) are well known in the art. See, e.g., EP0862937B1 as one of many examples of TSA to remove moisture.

In some arrangements, the process and system described herein incorporate adsorption techniques in which the regenerating bed can be purged with the $N_2$-rich residue gas (see, e.g., steam 9 in FIG. 1, stream 59 in FIG. 2, or streams 412, 419 and/or 420 in FIGS. 3 and 4).

Adsorbent materials that can be employed include but are not limited to silica gel, molecular sieves (e.g., 3A, 4A) and others.

Embodiments described herein can be practiced or adapted to separations other than those involving $CH_4$—$N_2$. Illustrative mixtures that could be separated by applying principles discussed above include but are not limited to _Ethane/Methane separation (or more generally NGL separation from natural gas) and CH4/CO separation.

The invention is further illustrated through the following nonlimiting example.

EXAMPLE

A computer simulation was conducted for a system such as that in FIG. 3, assuming the feed (stream 401) composition shown in Table 1. As seen in this table, methane is the major component, followed by nitrogen, ethane, propane, n-heptane, and n-butane. The feed is assumed to contain no water (removal of moisture from the feed can be conducted in a multi-bed adsorption arrangement such as described above) or hydrogen sulfide.

TABLE 1

| | Component | Amount |
|---|---|---|
| A | Mole Frac (Methane) | 91.05% |
| B | Mole Frac (Ethane) | 2.51% |
| C | Mole Frac (Propane) | 0.16% |
| D | Mole Frac (i-Butane) | 0.00% |
| E | Mole Frac (n-Butane) | 0.01% |
| F | Mole Frac (i-Pentane) | 0.00% |
| G | Mole Frac (n-Pentane) | 0.00% |

TABLE 1-continued

| | Component | Amount |
|---|---|---|
| H | Mole Frac (n-Hexane) | 0.00% |
| I | Mole Frac (n-Heptane) | 0.07% |
| J | Mole Frac (Nitrogen) | 6.20% |
| K | Mole Frac (CO2) | 0.00% |
| L | Mole Frac (n-Octane) | 0.00% |
| M | Mole Frac (n-Nonane) | 0.00% |
| N | Mole Frac (H2S) | 0.00% |
| O | Mole Frac (H2O) | 0.00% |

Initial conditions of the feed are shown in Table 2.

TABLE 2

| | | |
|---|---|---|
| 1 | Vapour Fraction | 1.00 |
| 2 | Temperature [F.] | 120 |
| 3 | Pressure [psig] | 1,000 |
| 4 | Molar Flow [MMSCFD] | 25.00 |
| 5 | Mass Flow [lb/hr] | 47,231 |
| 6 | HC Dew Point [F.] | <empty> |
| 7 | H2O Dew Point [F.] | <empty> |
| 8 | HHV [Btu/SCF] | 961 |

The compositions with respect to components A through O (from Table 1) present in each stream (location) identified in FIG. 3, as well as the conditions 1-8 from Table 2, are presented in Tables 3A, 3B and 3C, below.

TABLE 3A

| | 402 | 403 | 404 | 405 | 406 | 407 | 408 | 409 | 410 |
|---|---|---|---|---|---|---|---|---|---|
| 1 | 1.00 | 1.00 | 1.00 | 1.00 | 1.00 | 1.00 | 1.00 | 1.00 | 1.00 |
| 2 | 120 | 120 | 120 | −10 | 8 | −50 | −45 | 86 | 120 |
| 3 | 1,000 | 1,000 | 1,000 | 996 | 996 | 25 | 1,000 | 146 | 1,005 |
| 4 | 29.91 | 4.49 | 25.42 | 25.42 | 29.91 | 21.65 | 8.26 | 5.40 | 5.40 |
| 5 | 56,230 | 8,434 | 47,795 | 47,795 | 56,230 | 40,067 | 16,163 | 10,095 | 10,095 |
| 6 | <empty> | <empty> | <empty> | <empty> | <empty> | −166 | <empty> | −188 | <empty> |
| 7 | <empty> | <empty> | <empty> | <empty> | <empty> | <empty> | <empty> | <empty> | <empty> |
| 8 | 959 | 959 | 959 | 959 | 959 | 999 | 855 | 924 | 924 |
| A | 91.61% | 91.61% | 91.61% | 91.61% | 91.61% | 94.07% | 85.16% | 91.92% | 91.92% |
| B | 2.12% | 2.12% | 2.12% | 2.12% | 2.12% | 2.90% | 0.09% | 0.13% | 0.13% |
| C | 0.13% | 0.13% | 0.13% | 0.13% | 0.13% | 0.18% | 0.00% | 0.00% | 0.00% |
| D | 0.00% | 0.00% | 0.00% | 0.00% | 0.00% | 0.00% | 0.00% | 0.00% | 0.00% |
| E | 0.00% | 0.00% | 0.00% | 0.00% | 0.00% | 0.01% | 0.00% | 0.00% | 0.00% |
| F | 0.00% | 0.00% | 0.00% | 0.00% | 0.00% | 0.00% | 0.00% | 0.00% | 0.00% |
| G | 0.00% | 0.00% | 0.00% | 0.00% | 0.00% | 0.00% | 0.00% | 0.00% | 0.00% |
| H | 0.00% | 0.00% | 0.00% | 0.00% | 0.00% | 0.00% | 0.00% | 0.00% | 0.00% |
| I | 0.06% | 0.06% | 0.06% | 0.06% | 0.06% | 0.08% | 0.01% | 0.01% | 0.01% |
| J | 6.06% | 6.06% | 6.06% | 6.06% | 6.06% | 2.76% | 14.74% | 7.94% | 7.94% |
| K | 0.00% | 0.00% | 0.00% | 0.00% | 0.00% | 0.00% | 0.00% | 0.00% | 0.00% |
| L | 0.00% | 0.00% | 0.00% | 0.00% | 0.00% | 0.00% | 0.00% | 0.00% | 0.00% |
| M | 0.00% | 0.00% | 0.00% | 0.00% | 0.00% | 0.00% | 0.00% | 0.00% | 0.00% |
| N | 0.00% | 0.00% | 0.00% | 0.00% | 0.00% | 0.00% | 0.00% | 0.00% | 0.00% |
| O | 0.00% | 0.00% | 0.00% | 0.00% | 0.00% | 0.00% | 0.00% | 0.00% | 0.00% |

TABLE 3B

| | 410 | 411 | 412 | 414 | 415 | 416 | 417 | 418 |
|---|---|---|---|---|---|---|---|---|
| 1 | 1.00 | 1.00 | 1.00 | 1.00 | 1.00 | 1.00 | 1.00 | 1.00 |
| 2 | 120 | 50 | 0 | 0 | 86 | 120 | 50 | 30 |
| 3 | 1,005 | 1,001 | 1,001 | 150 | 146 | 1,000 | 996 | 150 |
| 4 | 5.40 | 5.40 | 0.50 | 4.91 | 4.91 | 4.91 | 8.26 | 5.40 |
| 5 | 10,095 | 10,095 | 1,096 | 8,999 | 8,999 | 8,999 | 16,163 | 10,095 |
| 6 | <empty> | <empty> | <empty> | −186 | −187 | <empty> | <empty> | −187 |
| 7 | <empty> | <empty> | <empty> | <empty> | <empty> | <empty> | <empty> | <empty> |
| 8 | 924 | 924 | 667 | 950 | 950 | 950 | 855 | 924 |
| A | 91.92% | 91.92% | 66.56% | 94.50% | 94.50% | 94.49% | 85.16% | 91.92% |
| B | 0.13% | 0.13% | 0.00% | 0.14% | 0.14% | 0.14% | 0.09% | 0.13% |
| C | 0.00% | 0.00% | 0.00% | 0.00% | 0.00% | 0.00% | 0.00% | 0.00% |
| D | 0.00% | 0.00% | 0.00% | 0.00% | 0.00% | 0.00% | 0.00% | 0.00% |
| E | 0.00% | 0.00% | 0.00% | 0.00% | 0.00% | 0.00% | 0.00% | 0.00% |
| F | 0.00% | 0.00% | 0.00% | 0.00% | 0.00% | 0.00% | 0.00% | 0.00% |
| G | 0.00% | 0.00% | 0.00% | 0.00% | 0.00% | 0.00% | 0.00% | 0.00% |
| H | 0.00% | 0.00% | 0.00% | 0.00% | 0.00% | 0.00% | 0.00% | 0.00% |
| I | 0.01% | 0.01% | 0.00% | 0.01% | 0.01% | 0.01% | 0.01% | 0.01% |
| J | 7.94% | 7.94% | 33.43% | 5.35% | 5.35% | 5.35% | 14.74% | 7.94% |
| K | 0.00% | 0.00% | 0.00% | 0.00% | 0.00% | 0.00% | 0.00% | 0.00% |
| L | 0.00% | 0.00% | 0.00% | 0.00% | 0.00% | 0.00% | 0.00% | 0.00% |
| M | 0.00% | 0.00% | 0.00% | 0.00% | 0.00% | 0.00% | 0.00% | 0.00% |
| N | 0.00% | 0.00% | 0.00% | 0.00% | 0.00% | 0.00% | 0.00% | 0.00% |
| O | 0.00% | 0.00% | 0.00% | 0.00% | 0.00% | 0.00% | 0.00% | 0.00% |

TABLE 3C

|   | 419 | 420 | 421 | 422 |
|---|---|---|---|---|
| 1 | 1.00 | 1.00 | 1.00 | 1.00 |
| 2 | −5 | −4 | 86 | 120 |
| 3 | 991 | 991 | 21 | 770 |
| 4 | 2.86 | 3.35 | 21.65 | 21.65 |
| 5 | 6,068 | 7,164 | 40,067 | 40,067 |
| 6 | <empty> | <empty> | −168 | <empty> |
| 7 | <empty> | <empty> | <empty> | <empty> |
| 8 | 726 | 717 | 999 | 999 |
| A | 72.37% | 71.51% | 94.07% | 94.07% |
| B | 0.02% | 0.01% | 2.90% | 2.90% |
| B | 0.00% | 0.00% | 0.18% | 0.18% |
| D | 0.00% | 0.00% | 0.00% | 0.00% |
| E | 0.00% | 0.00% | 0.01% | 0.01% |
| F | 0.00% | 0.00% | 0.00% | 0.00% |
| G | 0.00% | 0.00% | 0.00% | 0.00% |
| H | 0.00% | 0.00% | 0.00% | 0.00% |
| I | 0.00% | 0.00% | 0.08% | 0.08% |
| J | 27.61% | 28.47% | 2.76% | 2.76% |
| K | 0.00% | 0.00% | 0.00% | 0.00% |
| L | 0.00% | 0.00% | 0.00% | 0.00% |
| M | 0.00% | 0.00% | 0.00% | 0.00% |
| N | 0.00% | 0.00% | 0.00% | 0.00% |
| O | 0.00% | 0.00% | 0.00% | 0.00% |

As seen in the results of the computer simulation, it is possible to obtain efficiently a methane product containing less than 3% mol of nitrogen while recovering more than 90% of the hydrocarbons thanks to this process.

While this invention has been particularly shown and described with references to preferred embodiments thereof, it will be understood by those skilled in the art that various changes in form and details may be made therein without departing from the scope of the invention encompassed by the appended claims.

What is claimed is:

1. A membrane separation process, comprising:
cooling a natural gas feed containing methane and nitrogen in a main heat exchanger to produce a cooled feed at a temperature below 0° C.;
processing the cooled feed in a first membrane stage comprising rubbery membranes to produce a first permeate enriched in methane and a first residue enriched in nitrogen;
heating at least a portion of the first residue in the main heat exchanger to produce a heated first residue stream, introducing the heated first residue stream into a second membrane stage comprising rubbery membranes to produce a second permeate enriched in methane and a second residue enriched in nitrogen,
heating at least a portion of the first permeate in the main heat exchanger to produce a heated first permeate stream,
introducing the heated first permeate stream into a third membrane stage comprising rubbery membranes so as to obtain a third permeate enriched in methane and a third residue enriched in nitrogen, the third permeate being a methane-rich product,
and
recycling the second permeate back to the first membrane stage.

2. The process of claim 1, wherein no fluids are used to cool the main heat exchanger other than fluids derived from the first permeate and/or fluids derived from the first residue.

3. The process of claim 1, wherein the feed contains at least methane, nitrogen and water, water in the feed is removed in a multi-bed adsorption dryer, and adsorbent in the multi-bed adsorption dryer is regenerated using the second or third residue.

4. The process of claim 1, wherein the the second permeate is warmed in the main heat exchanger before being recycled back to the feed.

5. The process of claim 1, wherein the main heat exchanger is a multi-fluid heat exchanger.

6. The process of claim 1, further comprising the step of heating fluids derived from the second residue in the main heat exchanger.

7. The process of claim 1, further comprising the step of controlling a temperature of the cooled feed via a bypass valve.

8. A membrane separation system, comprising:
a source of natural gas comprising methane nitrogen;
a feed conduit for directing a flow of feed gas comprising methane and nitrogen;
first, second, and third membrane separation stages, each comprising rubbery membranes selective for methane over nitrogen, a feed inlet, a permeate outlet, and a residue outlet, wherein each of the membrane stages is adapted and configured to produce a respective permeate enriched in methane and a respective residue enriched in nitrogen, the feed inlet of the first membrane separation stage is in downstream flow communication with the feed conduit, the feed inlet of the third membrane separation stage is in downstream flow communication with the permeate outlet of the first membrane stage, and the feed inlet of the second membrane separation stage is in downstream flow communication with the residue outlet of the first membrane separation stage; and
a multi-fluid heat exchanger, wherein:
the first, second, and third membrane separation stages and the multi-fluid heat exchanger are adapted and configured to heat the retentate produced by the first membrane separation stage at the multi-fluid heat exchanger before being fed to the second membrane stage and heat the permeate produced by the first membrane stage at the multi-fluid heat exchanger before being fed to the third membrane stage; and
the feed conduit and the multi-fluid heat exchanger are adapted and configured for cooling the flow of feed gas at the multi-fluid heat exchanger.

9. The membrane separation system of claim 8, wherein no fluids are used to cool the main heat exchanger other than fluids derived from the permeate or residue produced by the first membrane stage.

10. The membrane separation system of claim 8, further comprising a bypass valve adapted and configured for controlling a temperature of a cooled feed introduced to the first membrane stage by allowing a portion of the flow of feed gas to bypass the multi-fluid heat exchanger, wherein the portion of the flow of feed gas that bypasses the multi-fluid heat exchanger is combined with a remaining portion of the flow of feed gas that is cooled at the multi-fluid heat exchanger before the combined portions are fed to the first membrane stage.

11. The membrane separation system of claim 8, further comprising a conduit for recycling the second permeate back to the feed that is in downstream fluid communication with the permeate outlet of the second membrane stage and in upstream flow communication with the feed inlet of the first membrane stage.

12. The membrane separation stage of claim 11, further comprising a compressor in fluid communication between the permeate outlet of the second membrane stage and the feed inlet of the first membrane stage.

13. The membrane separation system of claim 8, further comprising a conduit for recycling the permeate from the second membrane stage back to the feed that is in downstream fluid communication with the permeate outlet of the second membrane stage and in upstream flow communication with the feed inlet of the first membrane stage.

14. The membrane separation system of claim 13, further comprising a compressor in fluid communication between the permeate outlet of the second membrane stage and the feed inlet of the first membrane stage and a compressor in downstream fluid communication with the permeate outlet of the third membrane stage.

15. The membrane separation system of claim 8, wherein said system is configured to produce a first permeate having a nitrogen content that is less than 4 times a nitrogen content of the feed.

16. The membrane separation system of claim 8, wherein said system is configured to cool the flow of feed gas to a temperature below 0° C.

* * * * *